No. 678,236. Patented July 9, 1901.
W. C. FISH.
ELECTRIC MEASURING INSTRUMENT.
(Application filed Apr. 4, 1901.)
(No Model.)
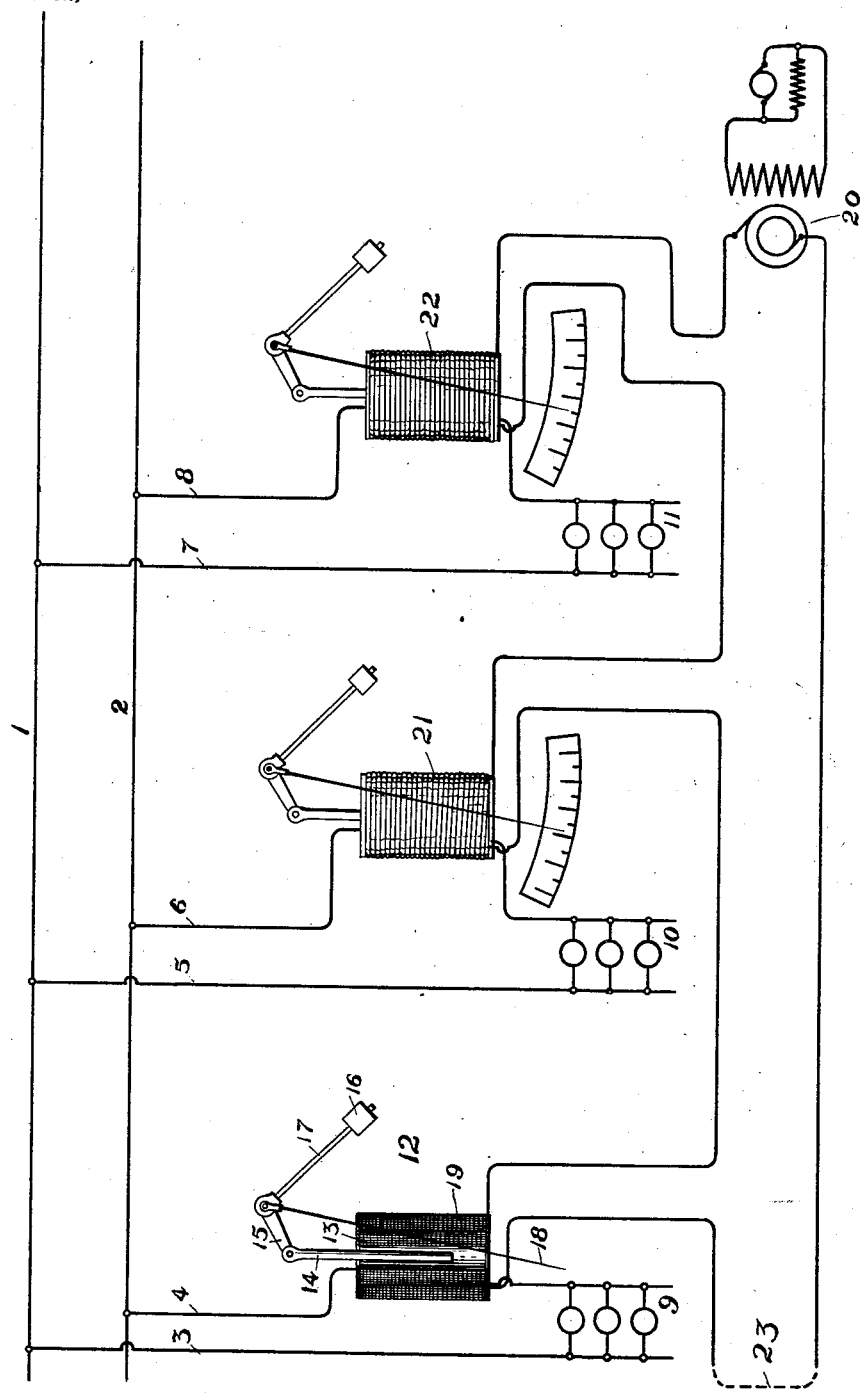
Witnesses
Inventor
Walter C. Fish

UNITED STATES PATENT OFFICE.

WALTER C. FISH, OF LYNN, MASSACHUSETTS, ASSIGNOR TO THE GENERAL ELECTRIC COMPANY, OF NEW YORK.

ELECTRIC MEASURING INSTRUMENT.

SPECIFICATION forming part of Letters Patent No. 678,236, dated July 9, 1901.

Application filed April 4, 1901. Serial No. 54,252. (No model.)

*To all whom it may concern:*

Be it known that I, WALTER C. FISH, a citizen of the United States, residing at Lynn, county of Essex, State of Massachusetts, have invented certain new and useful Improvements in Electric Measuring Instruments, (Case No. 1,621,) of which the following is a specification.

Electric measuring instruments which employ iron or other magnetic material in their construction possess the important advantage of large directive force, whereby the effect of friction of the moving parts becomes insignificant. Such instruments may therefore be made simple and strong without introducing any perceptible error due to friction. Such advantages as these instruments may possess, however, are counterbalanced by the serious error due to hysteresis of the iron forming part of their construction. This source of error generally causes such instruments to read low upon rising current and high upon falling current. This error I have discovered may be eliminated by superposing upon the iron of such an instrument an alternating magnetomotive force of proper frequency and value.

The accompanying drawing represents in diagram one embodiment of my invention.

In the diagram I have represented a number of measuring instruments, in this case of the direct-current type, in which the current to be measured passes through a solenoid, the magnetic field of which acts upon an iron rod or core suitably connected to a pointer, the deflection of which represents in suitable units the current passing through the solenoid. The instruments thus shown are supposed to be mounted upon a switchboard and connected, respectively, to various feeders or mains leading from the station.

At 1 and 2 are indicated a pair of bus-bars from which extend any number of sets of mains—as, for example, the mains 3 4, 5 to 6, and 7 8. Each of these pairs of mains feed any suitable translating devices, (indicated conventionally at 9, 10, and 11, respectively.)

In order the better to represent the construction of a measuring-instrument of the character described, I have at 12 shown such an instrument partly in cross-section.

At 13 is shown a coil in series with the main 4, which, in conjunction with the main 3, feeds the translating devices 9. This coil or solenoid acts upon the iron core 14, which is carrid by a pivoted rocker-arm 15. The core 14 may be suitably subdivided in order to reduce eddy-currents, and for this purpose may be made of a bundle of fine wires, if so desired. The returning movement for the core or rod 14 and the arm 15 is secured by means of the weight 16, adjustably mounted upon the lever-arm 17, mechanically connected to the moving system already described. A pointer 18, movable over a scale, (not shown,) serves to indicate the quantity measured by the instrument.

An additional coil 19 surrounds the coil 13, or is in any other suitable manner arranged in inductive relation to the magnetic core 14. Through this coil or solenoid 19 an alternating current of suitable value and frequency is caused to pass. This alternating current may be derived from any suitable source—as, for example, by means of a commutator or inverted rotary converter for changing direct current into alternating current; or, on the other hand, the alternating current may be generated directly, as by the use of an alternating-current generator, (indicated in this case in the drawing at 20.) This generator is shown as supplying current in series to the alternating-current coils of two measuring instruments 21 and 22, as well as to the instrument 12 of similar construction already described. This arrangement of circuits, however, is to be understood merely as illustrative, since it is obvious that the mode of feeding the alternating current to the respective measuring instruments may be carried out in a great number of different ways without departing from the spirit of my invention. A dotted line 23 indicates an indefinite extension of the closed series circuit fed by the generator 20.

The effect of the alternating magnetomotive force which is impressed upon the iron cores of the measuring instruments described can be imagined to be to set the molecules of the iron into rapid oscillation. During this oscillation the molecules are allowed intervals of comparative freedom during which they readily yield to any external magnetomotive force that may exist. The resultant magnetization is thereby rendered free from the lagging effect due to hysteresis, and the instrument of which the magnetic core forms the propelling element therefore gives the same deflection upon a rising current as with falling current. The amount of alternating magnetomotive force required, as well as the frequency of the same, depends upon the construction of the particular instrument to which my invention may be applied and may readily be found by trial. In the above explanation of my invention I have described the same as embodied in a simple form of current-measuring instrument. It will be obvious, however, to those skilled in the art that widely-different applications of my invention may be made without departing from the spirit thereof. The invention may, for example, be applied to voltmeters, wattmeters, and other measuring devices, as well as to the ammeter or current-measuring device set forth. For a better understanding of the scope of my invention attention is, however, directed to the claims appended hereto.

What I claim as new, and desire to secure by Letters Patent of the United States, is—

1. In an electric measuring instrument, the combination of relatively movable members, and means for simultaneously impressing upon one of the members a unidirectional magnetomotive force and an alternating magnetomotive force.

2. In an electric measuring instrument, the combination of a coil or winding, a member of magnetic material within the influence of said coil or winding, an additional or auxiliary coil or winding, means for supplying direct current to one of said coils or windings, and means for supplying alternating current to the other coil or winding.

3. In an electric measuring instrument, the combination of a coil for carrying direct current, an iron core, and means independent of said coil for impressing upon said core an alternating magnetomotive force.

4. In an electric measuring instrument, the combination of a movable member, and means for simultaneously impressing upon said movable member a unidirectional magnetomotive force and an alternating magnetomotive force.

5. In an electrical measuring instrument, the combination of a direct-current actuating-coil, a movable member, and means separate from said member for impressing an alternating magnetomotive force on said movable member.

6. In an electric measuring instrument, the combination of a direct-current actuating-coil, a movable member containing iron within the influence of said coil, an additional or auxiliary coil in operative relation to said movable member, and separate sources of current connected respectively to said coils.

In witness whereof I have hereunto set my hand this 1st day of April, 1901.

WALTER C. FISH.

Witnesses:
DUGALD McK. McKILLOP,
JOHN A. McMANUS.